Patented Feb. 22, 1938

2,109,445

UNITED STATES PATENT OFFICE 2,109,445

METHOD OF MANUFACTURING (1-PHENYL-2,3-DIMETHYL-5-PYRAZOLONYL)-ISOPENTYL-KETONE

Hans Kaufmann, Munster, Germany

No Drawing. Application May 7, 1936, Serial No. 78,519. In Germany May 7, 1935

3 Claims. (Cl. 260—45)

If 1-phenyl-2,3-dimethyl-5-pyrazolone is interacted with diethylacetyl chloride in the presence of agents which split off acid, such as aluminium chloride or zinc chloride, then the (1-phenyl-2,3-dimethyl-5-pyrazolonyl)-isopentyl ketone is formed having the composition:

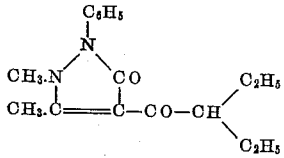

Operations are preferably carried out in indifferent solvents, such as carbon disulphide or benzene. The new ketone is a well crystallized substance, M. P. 132°, which can be recrystallized from water.

The preparation of ketones by the foregoing process is already known per se. Further, there are already references in the literature to analogous pyrazolonyl ketones. Thus in the German Specification No. 270,487 1-phenyl-2,3-dimethyl-4-aceto-5-pyrazolone is used as starting material for the preparation of antipyril quinoline carboxylic acid whilst in the Berichte der Deutschen Chemischen Gesellschaft, 1933, vol. 66, page 926 4-n-butyryl-antipyrin as well as Isovaleryl antipyrin are described. The pharmacological action of the last-named compounds, however, is only weak or is even non-existent. In contradistinction thereto, the new ketone has shown itself to have strong antipyretic action. In experiments on animals (rabbits) it was found to be many times superior in this respect to the starting substance 1-phenyl-2,3-dimethyl-5-pyrazolone.

*Example 1.*—To 19 parts of 1-phenyl-2,3-dimethyl-5-pyrazolone are added 13 parts of diethylacetyl chloride and 20 parts of aluminium chloride in the presence of carbon disulphide. The reaction which begins at first is completed by heating under reflux. As soon as the evolution of hydrogen chloride has ceased the solvent is expelled in vacuum and the residue is treated with ice water. The new substance separating out oily at first soon sets in the form of tabular crystals. Recrystallized from water, the (1-phenyl-2,3-dimethyl - 5 - pyrazolonyl)-isopentyl ketone forms glistening crystal scales of M. P. 132°.

*Example 2.*—Ten parts of 1-phenyl-2,3-dimethyl-5-pyrazolone are rubbed up with 8 parts of the acid chloride. Ten parts of powdered and freshly prepared aluminium chloride are introduced very slowly whilst stirring. After cessation of the hydrogen chloride evolution heating is carried out on the water bath. The cooled residue is treated with ice water and worked up in the afore-described manner.

*Example 3.*—Ten parts of 1-phenyl-2,3-dimethyl-5-pyrazolone are slowly heated under reflux on an oil bath with 8 parts of acid chloride and 8 parts of zinc chloride. At about 145° evolution of hydrochloric acid sets in. This temperature is maintained until this is finished, and the residue is worked up as in the previous examples to the new ketone.

I claim:

1. The method of preparing (1-phenyl-2,3-dimethyl-5-pyrazolonyl)-isopentyl ketone which consists in causing interaction between 1-phenyl-2,3-dimethyl-5-pyrazolone and diethylacetyl chloride in the presence of an agent capable of splitting off acid, and treating the resulting mixture with cool water, whereby the desired ketone separates.

2. The method of preparing (1-phenyl-2,3-dimethyl-5-pyrazolonyl)-isopentyl ketone which consists in causing interaction between 1-phenyl-2,3-dimethyl-5-pyrazolone and diethylacetyl chloride in the presence of an agent capable of splitting off acid, continuing the interaction until the evolution of hydrogen chloride ceases, treating the residue with ice water, and collecting the crystals of the required ketone which form.

3. As a new composition of matter (1-phenyl-2,3-dimethyl-5-pyrazolonyl)-isopentyl ketone.

HANS KAUFMANN.